Nov. 27, 1962 M. C. CREUSERE 3,065,911
SQUARE SUMMING MULTIPLIER
Filed Sept. 27, 1955 2 Sheets-Sheet 1

INVENTOR.
MELVILLE C. CREUSERE
ATTORNEYS

Nov. 27, 1962  M. C. CREUSERE  3,065,911
SQUARE SUMMING MULTIPLIER
Filed Sept. 27, 1955
2 Sheets-Sheet 2

INVENTOR.
MELVILLE C. CREUSERE
BY
ATTORNEYS

United States Patent Office 3,065,911
Patented Nov. 27, 1962

3,065,911
SQUARE SUMMING MULTIPLIER
Melville C. Creusere, China Lake, Calif., assignor to the United States of America as represented by the Secretary of the Navy
Filed Sept. 27, 1955, Ser. No. 537,075
2 Claims. (Cl. 235—194)
(Granted under Title 35, U.S. Code (1952), sec. 266)

The invention described herein may be manufactured and used by or for the Government of the United States of America for governmental purposes without the payment of any royalties thereon or therefor.

The present invention relates to an electronic multiplying circuit and particularly to a square summing multiplier using magnetic amplifiers.

The general purpose of the present invention is to produce a D.C. output voltage proportional to the product of two D.C. input voltages by use of diode shaping networks and magnetic amplifiers. Previous circuits for summing squares have involved the use of vacuum tubes for summing and also for obtaining the squares (by operating over a parabolic portion of their characteristic), and A.C. rather than D.C. computing voltages have been used.

A vacuum tube square summing multiplier has major limitations in accuracy and reliability as compared to a diode shaping network-magnetic amplifier circuit. Also, a vacuum tube squaring network depends on the non-linear characteristics of the tube, and this characteristic is only approximately square law, and may vary from tube to tube, thus imposing an accuracy limitation on the system. Furthermore, vacuum tubes are much more sensitive to vibration and more subject to failure than magnetic amplifiers. Such previous methods therefore, have the disadvantage of being limited in flexibility, accuracy, and reliability by reliance on vacuum tube characteristics.

An object of the present invention is to provide an improved, accurate and reliable means for multiplying two signal voltages to obtain a product.

Another object of the invention is to provide a multiplying circuit for squaring the sum and difference of two voltages to be multiplied and finding the difference between the two squares.

A further object of the invention is to provide a square summing multiplier using diode shaping networks and magnetic amplifiers.

A still further object of the invention is to provide an improved circuit for obtaining an output voltage proportional to the product of two input voltages.

Other objects and many of the attendant advantages of this invention will be readily appreciated as the same become better understood by reference to the following detailed description when considered in connection with the accompanying drawings wherein:

FIG. 1 is a block diagram of a square summing multiplier;

Figure 3:
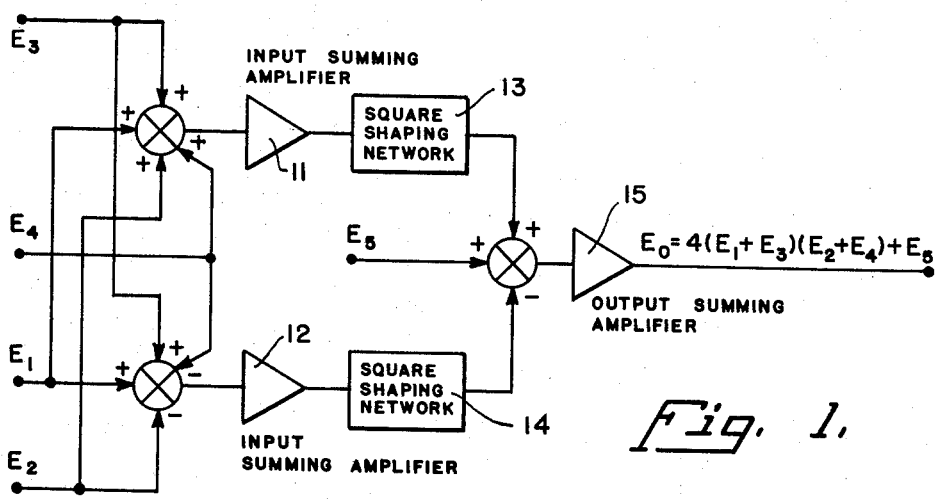
FIG. 3 is a schematic illustration of a square shaping network and a curve showing its operating characteristics.

The square summing multiplier multiplies two D.C. voltages, obtaining an output voltage proportional to the product of two D.C. input voltages by the use of diode shaping networks and magnetic amplifiers. Magnetic amplifiers of the type disclosed in co-pending patent application, Serial No. 449,810, filed August 13, 1954, now Patent No. 2,810,519, may be used. The multiplication is performed by first squaring the sum and the difference of the two voltages to be multiplied, and then finding the difference between the two squares. This difference will be proportional to the product of the two input voltages. Associated with the process of multiplication the circuits of the present invention permit the additional operations of adding a voltage to either of the two inputs before multiplication, or of adding a voltage to the product after multiplication. Expressed mathematically, this means that an overall operation of the following type can be obtained:

(1) $$E_0 = K_1(E_1 + K_2E_3)(E_2 + K_3E_4) + K_4E_5$$

where $E_0$ is the output voltage, $E_1$ and $E_2$ are the input signal voltages to be multiplied, $E_3$ and $E_4$ are voltages which may be added to the input voltages before multiplication, $E_5$ is a voltage which may be added to the product after multiplication, and $K_1$, $K_2$, $K_3$ and $K_4$ are constant multipliers to be selected according to the operation desired.

Referring to FIG. 1, a basic block diagram of a square summing multiplier is shown. This block diagram is not new, and is in fact, described in the book, Electronic Tube Circuits by S. Seely. However, the methods of instrumenting in the present invention, do not utilize the non-linear characteristics of vacuum tubes. The sum and the different of the two input signal voltages, $E_1$ and $E_2$, which are to be multiplied, are obtained by use of magnetic amplifiers 11 and 12. Voltages $E_3$ and $E_4$, which are constants, are added to the input signal voltages to insure that the summation of each said input voltage and said constant will always be of single polarity. The outputs of the two magnetic amplifiers, 11 and 12, are then each applied to a square shaping network 13, 14 by conductors or transmission lines 11a and 12a, respectively, which produce an output current proportional to the square of the input voltage from the magnetic amplifier. Voltage $E_5$ is added to the products after multiplication by being applied to the input of the output magnetic amplifier 15. The output current from networks 13 and 14 are fed through input coils 15a and 15b, respectively, by an output magnetic amplifier 15. Input coils 15a and 15b are series connected in transmission lines 11a and 12a and are wound in opposite electrical directions, so that the magnetic amplifier output is proportional to the difference in the two input currents. If all operations are performed accurately then, as indicated in the block diagram, the output voltage will be proportional to the product of the two input voltages. In addition to the multiplication process, the three summing magnetic amplifiers 11, 12 and 15 in the multiplier may be used to add voltages to either of the aforementioned input variables or to the output voltage.

Figure 2:
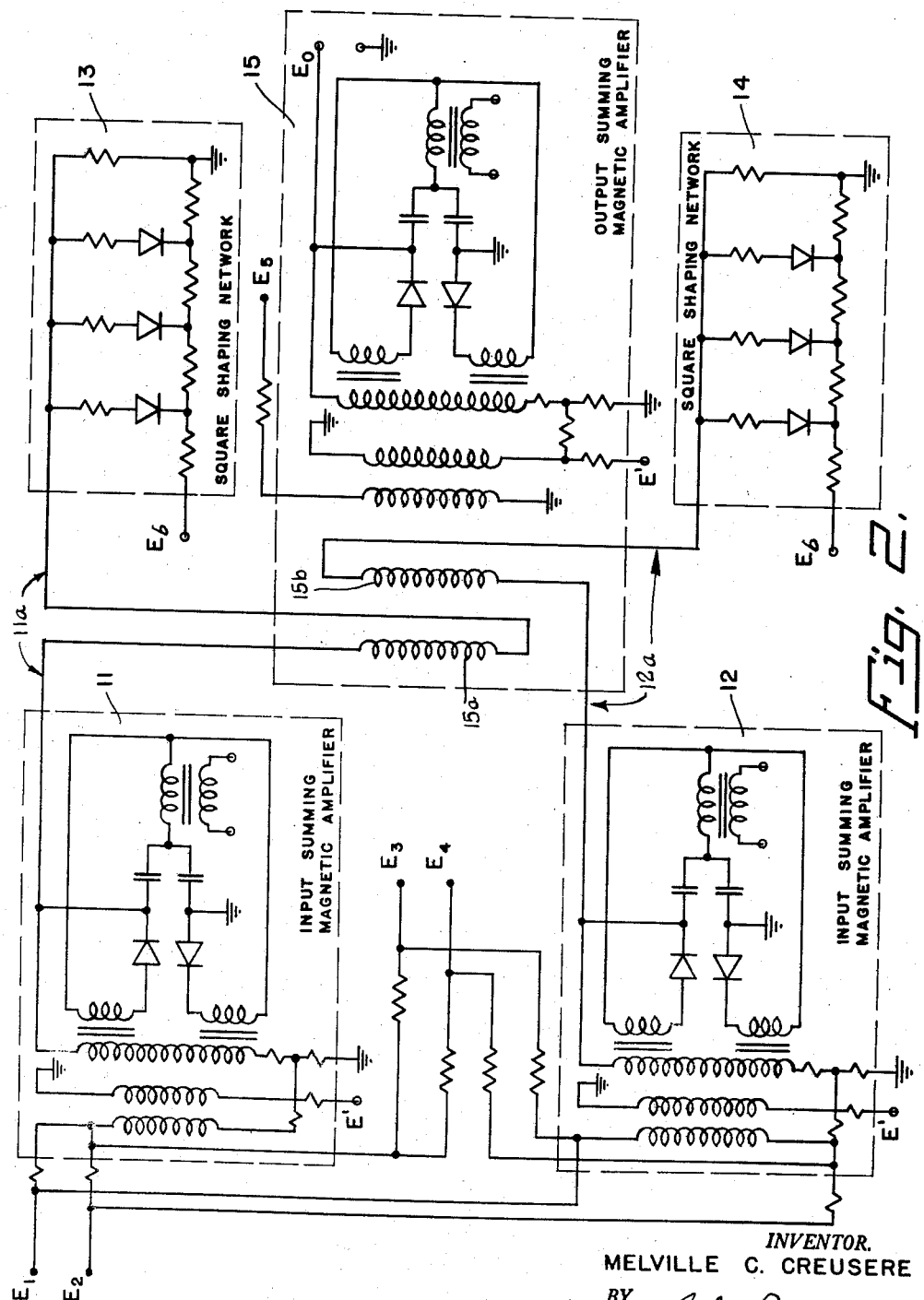
FIG. 2 is a schematic diagram of a square summing multiplier.

The process for squaring the sum and difference voltages may be accomplished by any one of several diode shaping networks. A complete circuit diagram of a square summing multiplier using one type of squaring network is shown in FIG. 2. Portions of the circuit represented by the blocks in FIG. 1 are indicated by dotted lines in FIG. 2. The squaring circuit produces a current output proportional to the square of the voltage input to the circuit. A squaring network and the method of matching the curve with it are illustrated in FIG. 3. When the input voltage $V_{in}$ is low, none of the diodes, $D_1$, $D_2$, $D_3$, are conducting, and the relation of output current to input voltage is linear with a certain slope which may be made to match the curve slope through proper choice of resistance, $R_0$. Any number of diodes may be used in the circuit, three having been shown by way of example. The resistance of the magnetic amplifier input winding may be neglected here since it is small compared to other resistances in the network. When the input voltage has risen until it is equal to the bias voltage $V_1$, diode $D_1$ starts conducting. This causes an increase in output current beyond that which would flow through $R_0$ of $$\frac{V_{in}-V_1}{R_1}$$

As a result, the current increases along a different straight line segment whose slope may be adjusted by adjustment of the resistance $R_1$. The point at which the slope changes is determined by the bias voltage $V_1$. Further slope changes may be made by controlling the point and amount of conduction of successive diodes in sequence. The effect of variation of resistance of the diode with change in plate voltage is to round off the corners of the approximating curve and thus permit a closer approximation to the desired curve.

Any numbers of inputs may be summed by use of the magnetic amplifier summing circuit illustrated for input summing magnetic amplifiers 11 and 12 shown in FIG. 2. The input voltages are added or substracted according to which side of the input winding they are applied to.

Figure 4:
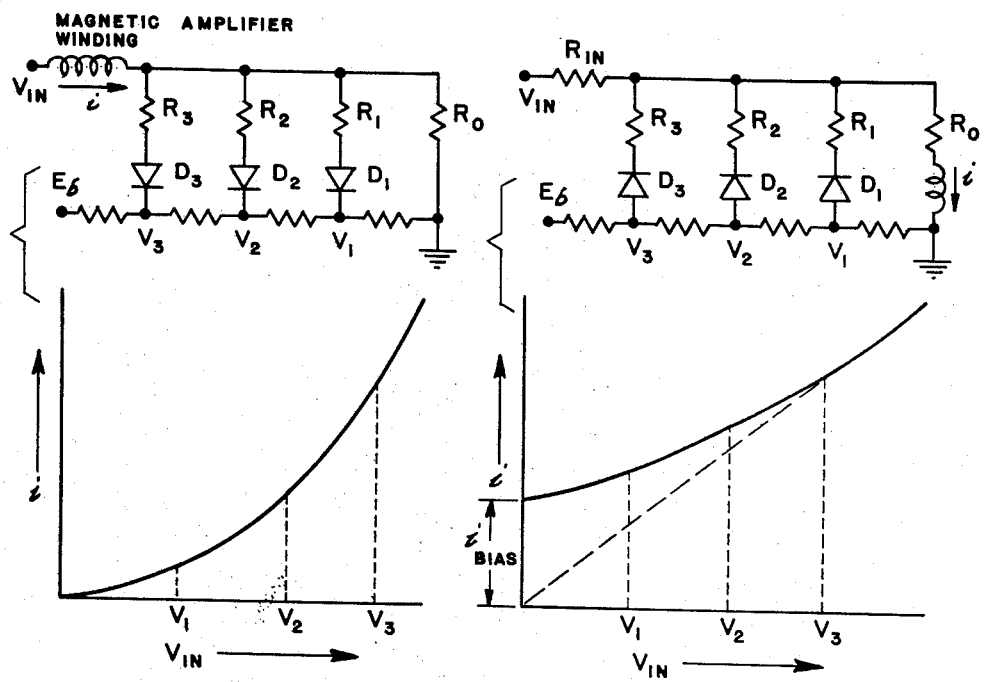
FIG. 4 is a schematic diagram of another square shaping network and its operation characteristics curve.

Another method of construction of the squaring network is illustrated in FIG. 4. In this circuit the maximum number of diodes are conducting at the low output end of the curve rather than at the high output end as was the case for the diode network illustrated in FIG. 3. When the input voltage $V_{in}$ increases to where it is equal to the bias voltage $V_1$, the diode $D_1$ will stop conducting causing an increase in output current. By controlling the shut-off point of successive diodes in sequence further changes in output current may be made as shown by the curve of FIG. 4. Since the output is a current to ground, the difference amplifier input may be a single centertapped control winding with one square shaping network on each side and the centertap grounded. The current output actually has a bias component, but since both networks have the same bias, it is effectively canceled out in the summing process.

Obviously, many modifications and variations of the present invention are possible in the light of the above teachings. It is therefore to be understood that within the scope of the appended claims the invention may be practiced otherwise than as specifically described.

What is claimed is:

1. A square summing multiplier for producing an output voltage which is a function of a first and a second D.C. input voltage comprising first and second magnetic summing amplifiers, said first magnetic amplifier producing a third D.C. voltage which is equal to the sum of said first and second voltages, said second magnetic amplifier producing a fourth D.C. voltage which equals the difference between said first and second voltages, a first diode shaping network to which said third voltage is applied by first transmission line means and which produces a first D.C. current in said first transmission line means which is proportional to the square of said third voltage, a second diode shaping network to which said fourth voltage is applied by second transmission line means and which produces a second D.C. current in said second transmission line means which is proportional to the square of said fourth voltage; said diode shaping networks each consisting of an input terminal, a first, second, third and fourth resistor each having one end connected to said input terminal, the other end of said first resistor being connected to an output terminal, the other end of said second, third and fourth resistors being connected directly to one side of a first, second and third diode respectively, a first bias resistor connected between said output terminal and the other side of said first diode, a second bias resistor connected between the other side of said first and second diodes, a third bias resistor connected between the other side of said second and third diodes, a fourth bias resistor connected between the other side of said third diode and a source of bias voltage, none of said diodes conducting when the network input voltage is low and when the network input voltage rises until it is equal to the bias voltage across said first bias resistor said first diode starts conducting resulting in a more rapid increase in output current with input voltage, said successive diodes conducting in sequence resulting in a further rate of current increase with increase in input voltage, all the diodes in each shaping network being connected in the same direction; a third magnetic summing amplifier having first and second input coils, said first input coil connected in series in said first transmission line means, said second input coil connected in series in said second transmission line means the field of said second coil created by said second current being in opposition to the field of said first coil created by said first current, said first and second currents producing a D.C. output voltage the magnitude of which is a linear function of the product of the input voltages.

2. A square summing multiplier for producing an output voltage which is a function of a first and a second D.C. input voltage comprising first and second magnetic summing amplifiers, said first magnetic amplifier producing a third D.C. voltage which is equal to the sum of said first and second voltages, said second magnetic amplifier producing a fourth D.C. voltage which equals the difference between said first and second voltages, a first diode shaping network to which said third voltage is applied by first transmission line means and which produces a first D.C. current in said first transmission line means which is proportional to the square of said third voltage, a second diode shaping network to which said fourth voltage is applied by second transmission line means and which produces a second D.C. current in said second transmission line means which is proportional to the square of said fourth voltage; said diode shaping networks each consisting of an input terminal, a plurality of resistors each having one end connected to said input terminal, the other end of one of said resistors being connected to an output terminal, a plurality of diodes, the other end of the remaining said resistors each being connected directly to one side of one of said diodes, all of said diodes in each shaping network being connected in the same direction, a bias resistor connected between said output terminal and the other side of the first of said diodes, a bias resistor connected between the other sides of each of the remaining said diodes in succession and between the last of said diodes and a source of bias voltage, none of said diodes conducting when the network input voltage is low and when the network input voltage rises to where it is equal to the voltage across the bias resistor between said output terminal and the other side of the first of said diodes said diode starts conducting resulting in a more rapid increase in diode network output current with increase in input voltage, and the other diodes conducting in sequence resulting in a further rate of current increase as said network input voltage rises; a third magnetic summing amplifier having first and second input coils, said first input coil connected in series in said first transmission line means, said second input coil connected to series in said second transmission line means the field of said second coil created by said second current being in opposition to the field of said first coil created by said first current, said first and second currents producing a D.C. output voltage the magnitude of which is a linear function of the product of the input voltages.

References Cited in the file of this patent

UNITED STATES PATENTS

| 2,434,155 | Haynes | Jan. 6, 1948 |
| 2,574,438 | Rossi et al. | Nov. 6, 1951 |
| 2,581,124 | Moe | Jan. 1, 1952 |

(Other references on following page)

UNITED STATES PATENTS

| | | |
|---|---|---|
| 2,663,832 | MacDonald et al. | Dec. 22, 1953 |
| 2,697,201 | Harder | Dec. 14, 1954 |
| 2,747,796 | Patterson | May 29, 1956 |
| 2,808,990 | Van Allen | Oct. 8, 1957 |

OTHER REFERENCES

Nature (Marshall) Jan. 6, 1951; pp. 29 and 30.

Proc. of the IEE (MacKay) October 1954; pp. 611 and 612.

Communications & Electronics (Davis et al.) January 1955; pp. 635–640.

Electron Tube Circuits (Seely) 1950 (pp. 153, FIGS. 8 to 12).

Electronic Engineering (Norsworthy) February 1954, No. 26, pp. 72–75.

The Review of Scientific Instrument (Chance et al.) September 1951, vol. 22, pp. 683–686, No. 9.

Norsworthy: "A Simple Electronic Multiplier," Electronic Engineering, vol. 26, February 1954 (pp. 72 and 73).